United States Patent [19]

Weaver

[11] 4,095,703
[45] Jun. 20, 1978

[54] DRIVE SYSTEM FOR SILO UNLOADER

[76] Inventor: Richard L. Weaver, Rte. 4, Myerstown, Pa. 17067

[21] Appl. No.: 826,348

[22] Filed: Aug. 22, 1977

Related U.S. Application Data

[63] Continuation of Ser. No. 641,155, Dec. 15, 1975, abandoned.

[51] Int. Cl.$^2$ ............................................. B65G 65/46
[52] U.S. Cl. ................................... 214/17 DA; 60/698
[58] Field of Search .................. 214/17 DA; 198/856; 408/10, 11; 60/698

[56] References Cited

U.S. PATENT DOCUMENTS

| | | | |
|---|---|---|---|
| 2,555,880 | 6/1951 | Fruechtel | 198/856 |
| 2,635,770 | 4/1953 | Tiedmann | 214/17 DA |
| 2,675,931 | 4/1954 | Makous | 214/17 DA |
| 3,237,788 | 3/1966 | Weaver et al. | 214/17 DA |
| 3,414,142 | 12/1968 | Kolze | 214/17 DA X |
| 3,493,130 | 2/1970 | Laidig | 214/17 DA |
| 3,499,556 | 3/1970 | Broberg | 214/17 DA |
| 3,508,670 | 4/1970 | Schuld | 214/17 DA |
| 3,519,152 | 7/1970 | Broberg | 214/17 DA |
| 3,539,058 | 11/1970 | Ferris | 214/17 DA |
| 3,581,916 | 6/1971 | Brumagin | 214/17 DA |
| 3,817,409 | 6/1974 | Weaver | 214/17 DA |
| 3,851,774 | 12/1974 | Laidig et al. | 214/17 DA |

Primary Examiner—Robert G. Sheridan

[57] ABSTRACT

A drive system is provided for a silo unloader, in which a generally radially disposed auger at the bottom of a silo, both rotates about its own axis, and sweeps across the bottom of the silo floor. A sweeping movement is provided by a hydraulic drive. The rotation of the auger about its own axis is provided by an electric mmotor drive that traverses a silage dischargeway disposed at the general center of the silo, and that drives the auger from its radial inner end. A protective covering is provided for part of a drive chain that connects an electric motor drive disposed outside the dischargeway with a portion of the drive train located inside the dischargeway. The electric motor drive is mounted for responding to a certain level of resistance to the auger turning on its own axis, that is engendered by silage contact, whereby the motor will pivot on its mount in reactive response to the driving the auger in rotation on its own axis, with the pivotal movement of the motor being operationally connected to the hydraulic drive that effects the sweeping movement of the auger, to discontinue the provision of hydraulic fluid to the sweeping-motion-drive, until silage resistance is reduced.

17 Claims, 8 Drawing Figures

DRIVE SYSTEM FOR SILO UNLOADER

This is a continuation, of application Ser. No. 641,155, filed Dec. 15, 1975, now abandoned.

BACKGROUND OF THE INVENTION

In silo bottom unloaders of my previous developments, such as U.S. Pat. No. 3,817,409, the disclosure of which I herein incorporate by reference, I have utilized an auger that sweeps across the floor of a silo, in its advancing movement, and which also rotates on its own axis, in response to a drive that is generally centrally located with respect to a center dischargeway or passageway of a silo, at the bottom thereof. In the past, both the traversing motion and the rotational motion for driving the auger have been hydraulic. While offering many operational benefits, substantially complete hydraulic drive systems have come to be expensive, and in many instances prohibitively expensive. In my previous systems, the auger advance has been discontinued upon the auger meeting excess silage resistance. Such discontinuance has been by means of hydraulics.

THE PRESENT INVENTION

The present invention is directed toward providing an economical auger drive for bottom silo discharge, wherein that portion of the drive that effects a rotation of the auger about its own axis for delivery of silage toward a generally central dischargeway is provided by a motor, preferably an electric motor, with a drive train connecting the motor from its location outside the passageway, to a radial inner portion of the auger for driving the same. A portion of the drive train passes through the open central dischargeway and accordingly, is provided with a protector that has upper surfaces sloped so as to deflect silage from accumulating thereon. The electric motor drive is mounted in such a way that the motor is freely pivotally mounted within a certain predetermined range such that it can pivot in reactive response to the motor torque developed in rotationally driving the auger about its own axis against excessive silage resistance. Upon meeting a predetermined level of resistance and with consequent motor pivoting, a valve is opened to interrupt the traversing or advancing drive of the auger (the latter preferably being hydraulic) until the silage is shredded, comminuted, or the like, such as will relieve the excess resistance, at which point the motor will pivot back to its original position, for re-closing of the valve for continuing of the auger advance.

Accordingly, it is a primary object of this invention to provide a novel drive system for silo unloaders.

It is a further object of this invention to provide a novel drive system generally of the type in which a driven member has a pair of drives, whereby the resistance encountered by one of the drives may be operationally utilized to control the second drive.

It is a further object of this invention to accomplish the above object with specific emphasis on silo unloaders, whereby the rotational drive of a silo may encounter resistance that, in turn, may operationally interrupt the traversing drive of a silo across the floor of the silo.

It is another object of this invention to provide a novel protector for a component of a drive train of a silo auger.

It is a further object of this invention to provide a novel electric motor type of drive for rotating a silo auger about its own axis, and by applying the rotational force at the approximate center of the silo, to a radial inner portion of the auger, through a central silage exit passageway, and with a traversing drive of the silo being provided by another means.

Other objects and advantages of the present invention will be readily apparent to those skilled in the art from a reading of the following brief descriptions of the drawing figures, detailed descriptions of the preferred embodiments, and the appended claims.

BRIEF DESCRIPTIONS OF THE DRAWING FIGURES

FIG. 1 is a top plan view of the bottom inside portion of a silo, wherein a bottom centrally located silage dischargeway is illustrated, along with an advancing auger of the bottom unloader type, and a track for facilitating the advance thereof, and with the silo itself and an advancing mechanism and the auger rotational drive mechanism all being illustrated in phantom for ease of understanding.

FIG. 2 is a fragmentary vertical sectional view, taken through the silo floor and walls generally along the line II—II of FIG. 1, and with the auger being illustrated in elevation, along with the rotational drive for the auger, and with the section being taken through the generally centrally located silage dischargeway, and with the hydraulic sweeping or traversing drive for the auger being schematically illustrated.

FIG. 3 is an enlarged fragmentary tranverse vertical sectional view of the auger rotational drive, taken through the silage central dischargeway, and through the drive train for rotationally driving the auger, with the view being taken generally along a portion of the section line II—II of FIG. 1, but wherein many of the drive components are illustrated in section, and with a portion of the auger being illustrated in phantom, for purposes of clarity.

FIG. 6 is a vertical sectional view taken through the belt portion of the drive chain and its protective covering generally along the line VI—VI of FIG. 3, and wherein the sloped upper surface for deflecting silage thereoff is more clearly illustrated.

DETAILED DESCRIPTIONS OF THE PREFERRED EMBODIMENTS

Figure 1:
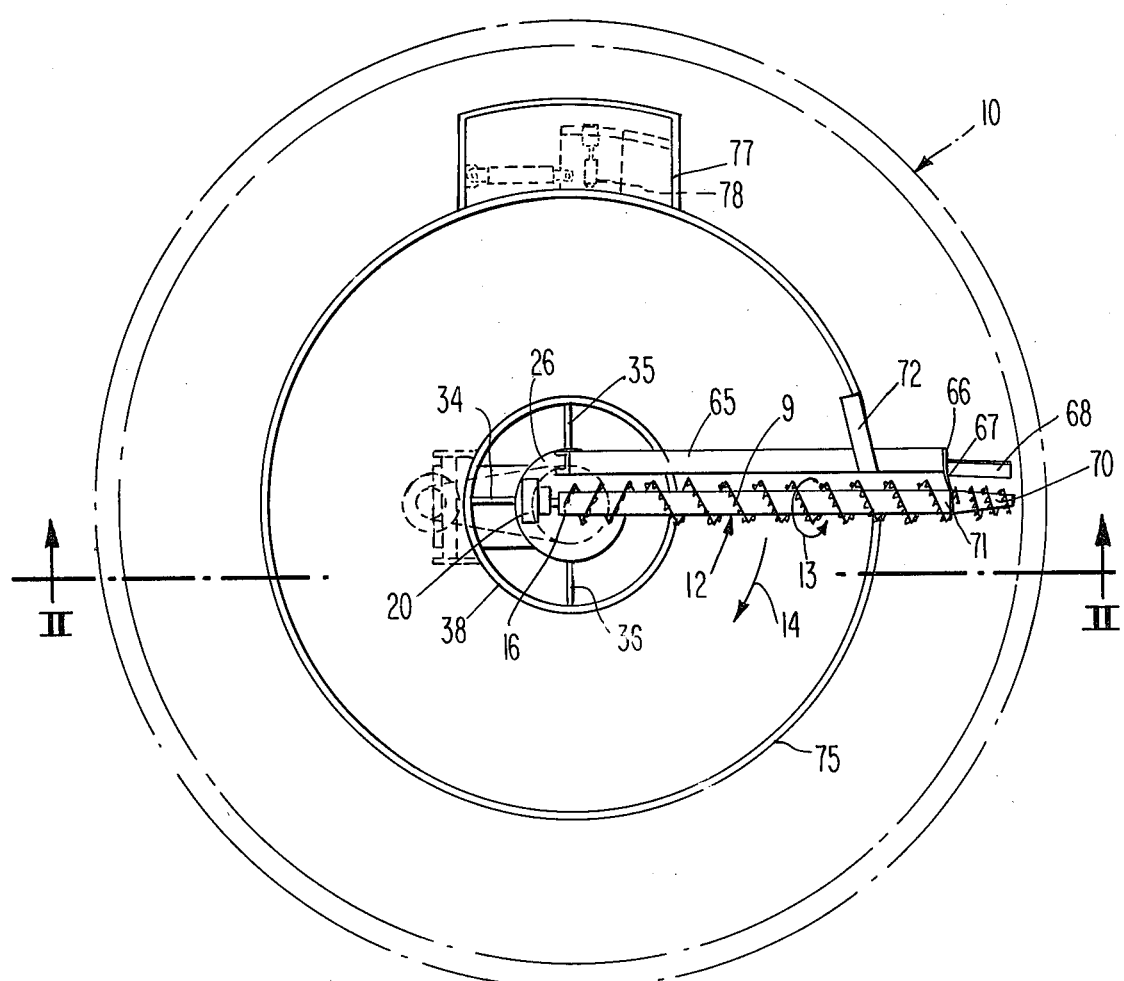

Referring now to the drawings, reference is first made to FIG. 1, wherein there is illustrated a silo, generally designated by the numeral 10, as comprising generally vertical cylindrical walls 11, and a floor 19, the silo preferably being of poured concrete or like construction, and having an upper roof or enclosure (not illustrated).

Figure 2:
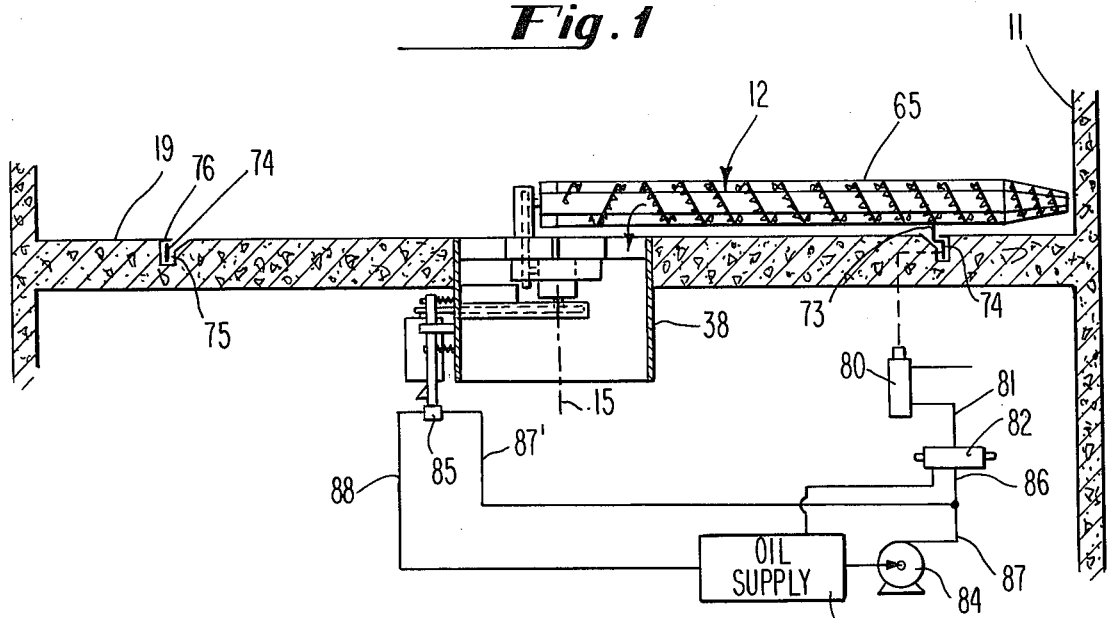

A silo unloader 12 of the rotary auger type is illustrated, being generally radially disposed, from the approximate geometric center of the silo toward the wall 11, and being mounted for a combined motion involving both rotating about its own axis in the direction of the arrow 13 illustrated in FIG. 1, and for advancing in a clockwise direction, as indicated by the arrow 14 in FIG. 1, with its latter motion being about a centrally located axis 15 (FIG. 2).

Figure 3:
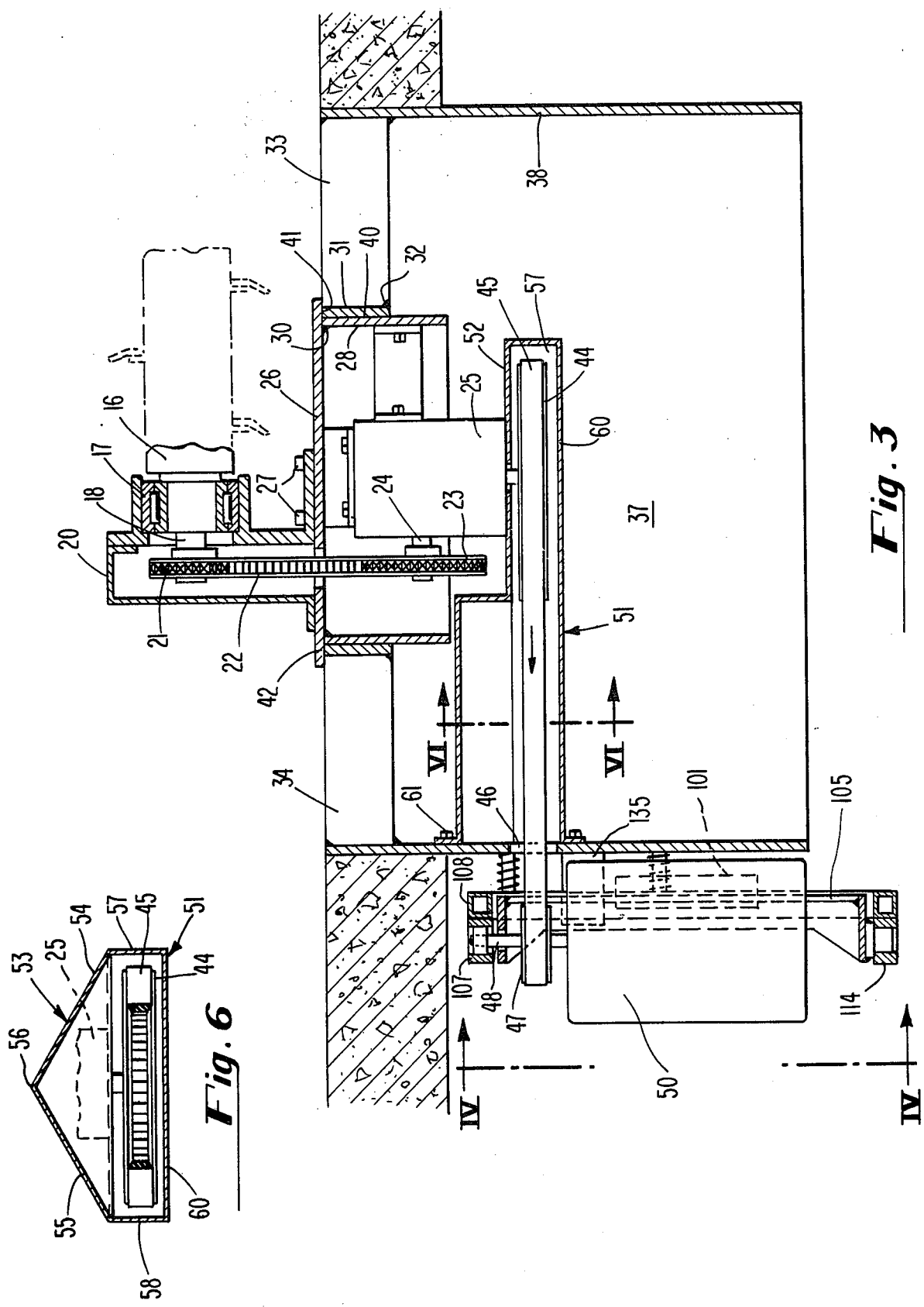

With reference to FIG. 1, the radial inner end 16 of the auger is bearing mounted at 17, with its shaft 18 protruding into an enclosure 20, and carrying a sprocket 21 on the end thereof. The sprocket 21 carries a chain 22 that in turn is connected to a sprocket 23 carried on the output shaft 24 of a reducing transmission 25. The enclosure 20 is disposed about the sprocket 21 and chain, to protect the same from becoming encumbered by silage or the like, and is carried by an upper plate 26 by means of bolts 27 or the like. The upper plate 26 has a cylindrical member 28 welded thereto at 30, and the two members 26 and 28 pivot or slide relative to a fixedly disposed cylindrical support member 31, as the auger 12 advances or sweeps across the floor 19 of the silo. Thus, the members 26 and 28 also move about their axis 15, as the auger 12 advances. The fixedly mounted cylindrical support member 31 is maintained in position by being in welded engagement at 32 with spacing members 33, 34, 35 and 36, that span a dischargeway 37 as illustrated in FIG. 3, in order to space the members 26 and 28 from a fixedly mounted cylindrical discharge chute 38 carried by the floor 19 of the silo at the approximate geometric center thereof, generally concentric with the silo walls 11. It will thus be seen that, with reference to FIG. 3, the members 28 and 31 meet at a sliding or friction surface 40, and the lower outer lip or surface 41 slides on the upper surface 42 when the auger 12 advances.

The transmission 25 has an input pulley 44, to which a pulley belt 45 is connected in the usual manner, with the pulley belt 45 extending out through the cylindrical wall 38 of the discharge chute through a hole or opening 46, to a drive pulley 47 carried on a shaft 48 of an electric motor 50.

A protective covering 51 of the enclosure type is provided, for encasing the pulley 44 in the manner illustrated as 52 in FIG. 3, and having an upper surface 53 that comprises a pair of sloped surface walls 54 and 55 that meet in an apex 56, with the slopes of the walls 54 and 55 being sufficient to deflect silage that is falling downwardly through the dischargeway 37 from above, off the surfaces 54 and 55, to prevent silage accumulation thereon. It will be noted that the protective covering 51 also includes sidewalls 57 and 58, and a bottom wall 60. The protective covering 51 is carried by the left-most end of the cylindrical chute 38 as illustrated in FIG. 3 by suitable threaded bolt type connecting members 61.

The advance for traversing the auger 12 across the floor 19 of the silo 10 is provided as follows. An auger back 65 is provided, also carried by the moveable plate 26 for movement of its left end with the member 20 and with the left end 16 of the auger 12, with the auger back extending out to an auger outer end support portion 66 that includes an auger outer end support 67, and an auxiliary auger back 68 extending behind an auxiliary auger portions 70. The outer end 71 of the main auger 12 and the auxiliary 70 are therefore carried by the support 67 that in turn is carried by the outer end 66 of the auger back 65. The auger back is, in turn, securely mounted to and carried by an auger-track connector member 72. The connector member 72 has a portion 73 that connects the auger back to a moveable cylindrically configured band 74 that is slideably carried in a generally circular track 74. The circular track 75 is substantially concentric with and spaced inwardly from the silo walls 11, and is disposed in the floor 19 of the silo, with an overhanging cover 76, as illustrated in FIG. 2, to prevent silage from falling into and filling the track 75.

The drive mechanism for driving the band 74 relative to the track 75 is located in a pit 77 (FIG. 1) beneath the floor 19 of the silo, and generally comprises a cylinder 78 that carries a dog (not shown) for engaging in holes or openings (not shown) carried by the band 74, such that, when the dogs are engaged, a stroke cylinder 80 is actuated to drive both the cylinder 78 and the band 74 with which it is connected through a given stroke. This is followed by retraction of the dogs by reverse actuation of the cylinder 78, followed by withdrawal of the piston in the cylinder 80, that in turn is followed by re-engagement of the dog carried by the cylinder 78 with another hole in the band 74, etc., for continued intermittent drive of the band 74, in a manner not specifically forming a portion of the present invention. The drive system embracing the cylinders 78 and 80 is a hydraulic drive system that is the subject of another invention. However, with specific reference to the schematic of FIG. 2, the manner in which the rotational drive for the auger 12 interacts with the advancing drive will be understood. The advancing drive cylinder 80 is provided with hydraulic fluid through the line 81, that in turn receives the fluid from a a combination forward-reversing valve 82 which valve controls whether or not the cylinders 78 and 80 will effect a forward or reversing direction of drive for the band 74) and with the valve 82 being provided hydraulic fluid from the fluid supply 83 by means of a pump 84 passing through a rotary valve 85 on its way through the line 86 to the valve 82. Upon opening of the normally closed valve 85 (which occurs when the auger meets excessive resistance from silage such that the motor 50 pivots under the reactive torque generated upon meeting such resistance and thereby opens the valve 85), the hydraulic fluid that is pumped by the pump 84, to the valve 85, through the lines 87, 87' may be dumped back into the supply 83, through the line 88.

Figure 4:
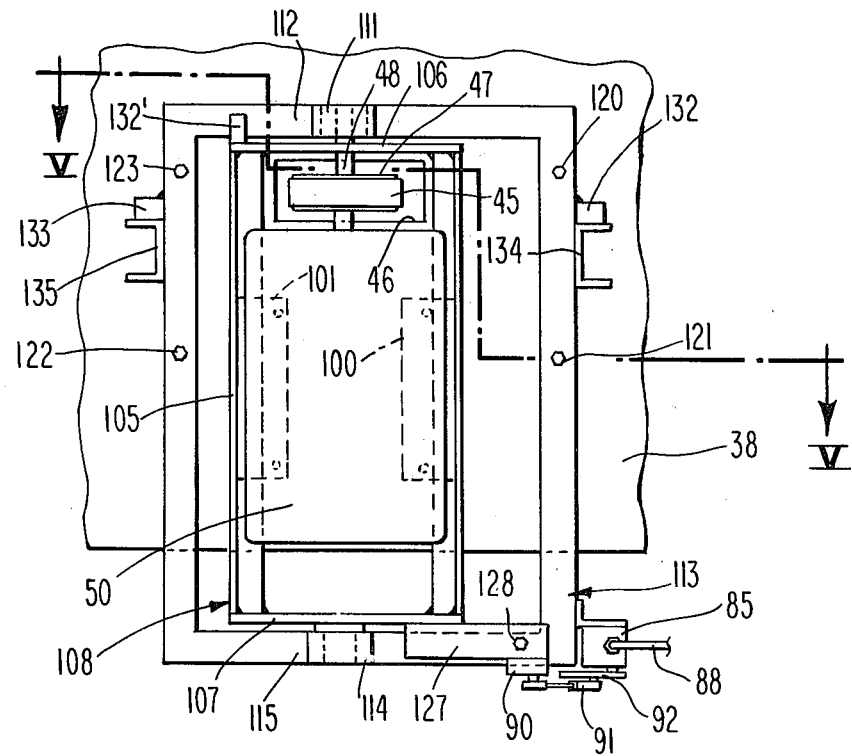
FIG. 4 is an enlarged fragmentary vertical elevational view of a portion of the rotational drive mechanism for the silo unloader system illustrated in FIG. 3, taken generally along the line IV—IV of FIG. 3, and wherein the various pivotal mounting components for the electric motor drive are more clearly illustrated.
Figure 5:
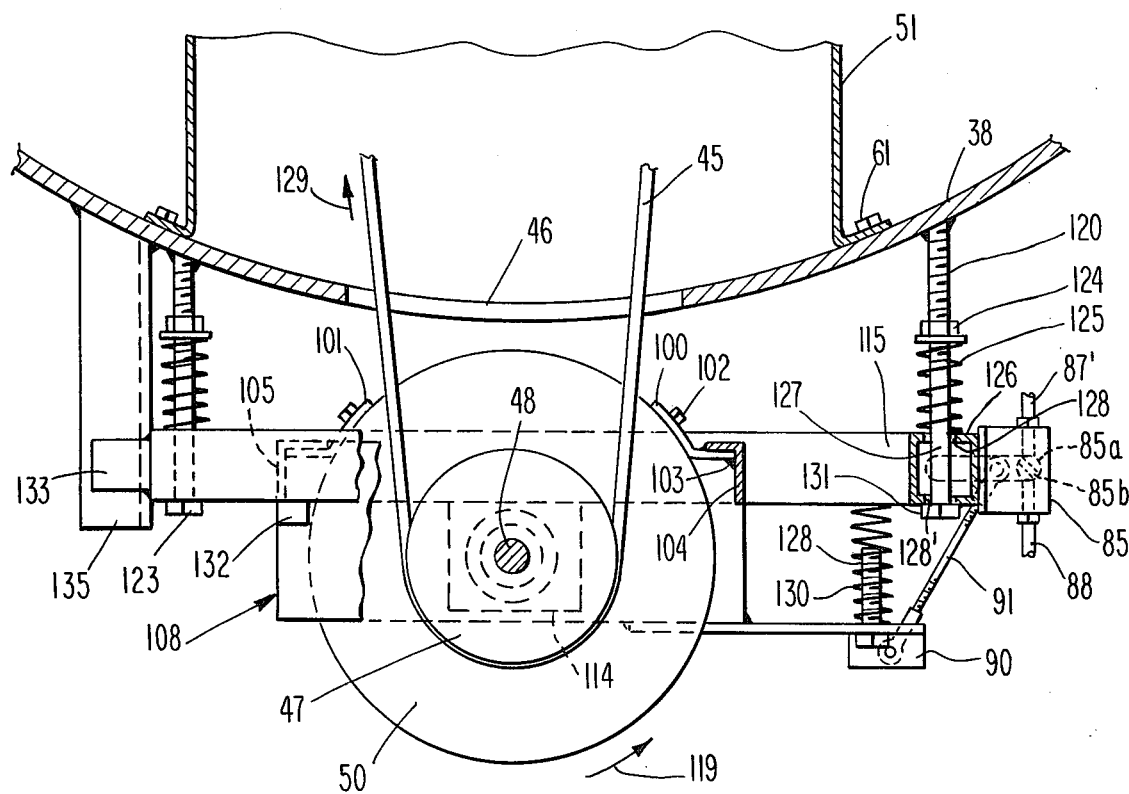
FIG. 5 is an enlarged fragmentary horizontal sectional view taken generally along the line V—V of FIG. 4, and wherein certain operative components for the device of this invention are more clearly illustrated.

With particular reference to FIGS. 4 and 5, it will be seen that the motor 50 is provided with brackets 100, 101 that are connected to the motor 50 by suitable fasteners 102, and with the brackets 100 and 101 being welded or otherwise suitably secured at 103 to the suitable angle members 104, 105. The angle members 104, 105, together with upper and lower frame members 106 and 107, also suitably welded as illustrated comprise an internal frame for the motor 50, generally designated as 108. The output shaft 48 of the motor 50 passes through the horizontal frame portion 106, as suitably journaled in a pillow block bearing 111, that in turn is carried by a horizontal outer frame portion 112, of the outer or more rigidly mounted frame generally designated by the numeral 113.

The lower inner frame portion 107 is also journaled for free pivotal movement at 114, by a bearing member carried by the lower portion 115 of outer frame 113.

The frame 113 is carried in substantially rigid condition on four threaded members 120, 121, 122, and 123, all substantially identical in construction. The members 120 through 123 are fixedly connected by welding, or are in threaded connection in cylindrical wall 38, as illustrated for member 120, and each have a nut member 124 in threaded engagement therewith, the outer end of which is disposed in spring-comprising relation against a compression spring 125, the opposite end of which is in engagement against an associated surface 126 of the rigid frame member 113, and with an unthreaded shank portion 127 of the threaded member 120 passing through oversized holes 128 and 128', and with an enlarged head portion 131 of each of the members 120, facilitating a capturing of the frame 113 against outward movement. It will be noted that the springs 125 are selected to substantially rigidly hold the frame 113 against motion, but will cushion the frame 113, to protect it against shocks. The weight of the motor 50 and frame 113 and related components is carried by suitable slide lugs 132 and 133, welded or otherwise suitably secured to the frame 113, and in sliding engagement on upper surfaces of channel members 134 and 135, respectively.

Upon traversing movement of the auger 12 in the direction of the arrow 14 of FIG. 1, and with rotation of the auger about its own axis as indicated by the arrow 13 in FIG. 1, whereupon the fliting 9 on the auger conveys silage radially inwardly to a position above the open chute 38, the auger 12 may encounter resistance upon meeting excessively hard packed silage. Rather than damaging the motor 50, or damaging drive components that otherwise provide rotational drive or the sweeping drive by forcing the auger drive systems to labor, a means is provided for discontinuing temporarily the advance movement of the auger, by discontinuing the drive of the cylinder 80, in turn by discontinuing the provision of hydraulic fluid to the cylinder 80. This is done by opening of the rotatable ball valve 85. Upon the motor 50 encountering such resistance, the motor, normally driving for example in the direction of belt drive illustrated for the belt 45 by the arrow 129 of FIG. 5, will tend to pivot in the direction of the arrow 119 of FIG. 5, such pivoting movement being in reactive response to the motor torque developed in driving the auger against the excessive silage resistance. As the motor 50 pivots in the direction of the arrow 121 in FIG. 5, a lug 90 carried thereby will move a threaded adjustable linkage 91 that in turn will pivot lever 92 that rotates a ball 85a so that its through-hole 85b is pivoted from the closed position illustrated in FIG. 5 to an open valve position aligned with hydraulic lines 87' and 88 for delivery of hydraulic fluid back to supply 83.

The member 90 is carried by lever arm 127 that in turn is securely and rigidly carried by the pivotal frame member 108 that is mounted for pivotal movement with the motor 50 by means of the previously discussed brackets 100 and 101. A stop member 128 is provided, in the form of a threaded member, in threaded engagement through the member 127, for limiting the pivotal movement of the motor 50 in the direction of the arrow 121, for abutment of the threaded member 128 against the more rigidly mounted frame member 113, as illustrated in FIG. 4. A compression spring 130 is provided, for keeping the motor in its usual unpivoted position, and for offering an initial predetermined resistance to pivoting of the motor 50, below which level, the resistance encountered by the rotating auger will not discontinue the advancing drive of the auger. A stop 132' is also provided, carried by the horizontal portion 114 of pivotal inner frame 108, for engagement against horizontal portion 112 of outer frame member 113, upon the motor pivoting back to its initial position illustrated in FIG. 5, upon re-closing of the valve 85 when the ball 85 returns to its closed position illustrated in FIG. 5, for facilitating a limiting of the arc of movement of the motor 50 as determined by the stops 132' and 128. When the valve 85 is closed, fluid is free to pass to the member 82 through line 86, whereupon advancing (or retraction, depending upon the setting of the reversing valve 82) movement of the auger will re-occur.

Figure 7:
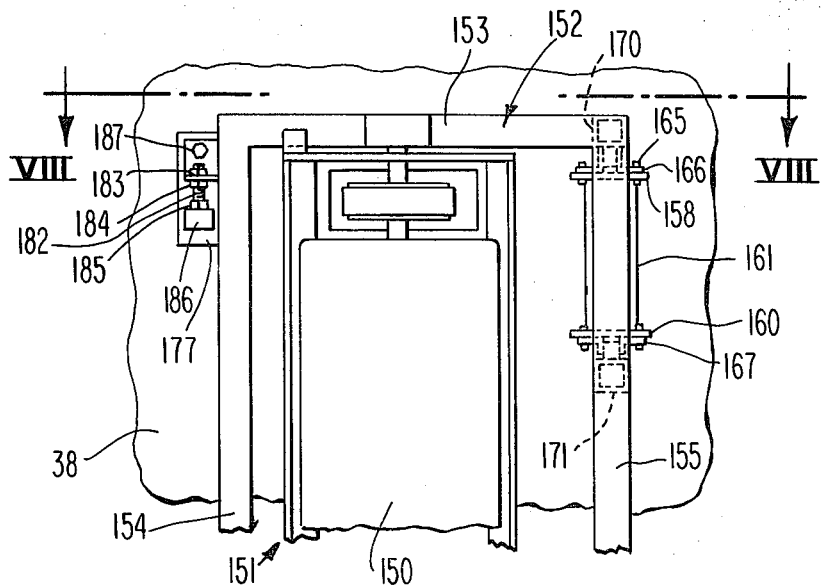
FIG. 7 is an enlarged fragmentary vertical elevational view of a portion of a preferred form of the rotational drive mechanism for the silo unloader system to that illustrated in FIG. 3, wherein a frame is pivotally mounted, as distinguished from the slide mounting arrangement illustrated in FIG. 3.
Figure 8:
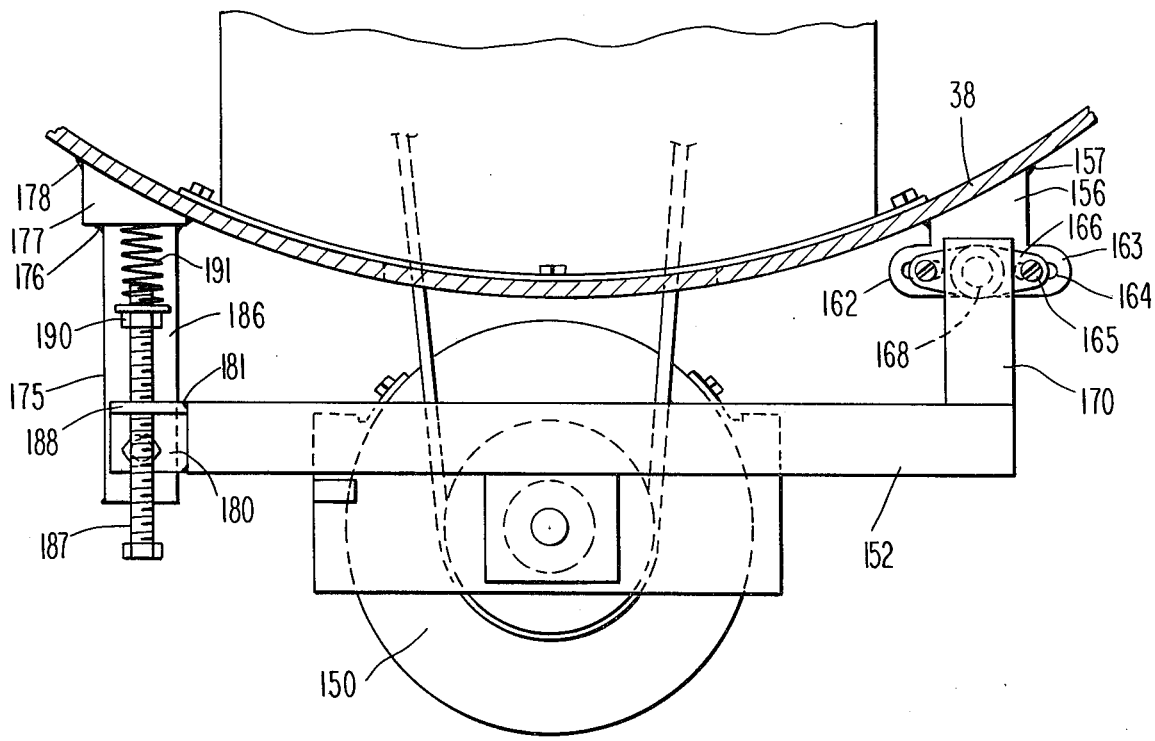
FIG. 8 is an enlarged fragmentary horizontal sectional view, taken generally along the line VIII—VIII of FIG. 7, and wherein certain operative components of the preferred frame mounting arrangement illustrated in FIG. 7 are more clearly illustrated.

With reference now to FIGS. 7 and 8, a preferred mounting arrangement for the more rigid frame designated 113 in FIG. 4 is illustrated, rather than the sliding lugs 132, 133 on the frame members 134, 135, respectively. In the embodiment of FIGS. 7 and 8, the motor 150 is mounted in a pivotal inner frame 151 in the identical manner to that illustrated and described with respect to the embodiment of FIGS. 4 and 5, and the pivotal inner frame 151 is mounted in and carried by the outer frame 152 in a manner essentially identical to that illustrated for the embodiment of FIGS. 4 and 5. However, the frame 152 of FIGS. 7 and 8, while being substantially similarly constructed to that construction described for the frame 113 of FIGS. 4 and 5, is provided with a different means of mounting it. The frame 152 is illustrated as having a horizontal member 153, a lower member generally parallel to the horizontal member 153 (not illustrated), and connecting vertical members 154 and 155.

The arcuate member 38 is provided with a support 156, welded or otherwise suitably carried thereby by at 157, that in turn carries fixed portions of a hinged member, comprising vertically spaced-apart upper and lower end portions 158 and 160, with an intermediate casing portion 161. The upper and lower members 158 and 160 are provided with outwardly protruding ears 162 and 163, each with slotted holes 164 therein, for receipt of threaded bolt members 165 therein, for connecting mounting plates 166 and 167 of that portion of the hinge that is carried by the frame 152. The plates 166 and 167 are thus connected to the mounting portions 158 and 160 by the bolt-type fasteners 165, with the slotted holes 164 allowing for adjustment upon assembly. The hinge portion 161 carries a shaft 168 that is engaged by the mounting plates 166 and 167, at its ends, whereby, as the member 152 is pivoted, in turn pivoting the upper and lower connecting lugs 170 and 171, and in turn pivoting the end caps 166 and 167, the shaft 168 provides a basis for pivotal movement of the frame member 152 relative to the discharge chute 38.

A frame support 175 is welded at 176 or otherwise suitably carried by a support 177, that in turn is carried by the wall of the discharge chute 38 at 178, and provides a vertical support for the frame 152, at its left end as viewed in FIGS. 7 and 8. A piece of angle iron or the like 180 is welded or otherwise suitably carried at 181 by the left upper end of the vertical member 154 of the frame 152, and in turn carries a threaded member 182 vertically disposed therein, and adjustably positioned by means of nuts 183 and 184, with the threaded member 182 carrying a bolt head or other suitable supporting foot 185 at its lower end. The bolt head 185 will normally rest on the upper surface 186 of the member 175, but is adjustably positionable therealong, and in the event of shock or abrupt motion being transmitted to the frame 155, will allow for sliding movement of the frame 152 by means of the head 185 of the threaded member 182 sliding along the surface 186, while the frame 152 pivots at the location of the pivot shaft 168. Thus, the arrangement specifically depicted in FIGS. 7 and 8 allows for an original adjustment of the position of the frame 152 and the motor 150 carried thereby, and also allows for movement of the frame in the event of accessive shock or impact, should it occur. The position of the frame 152 away from the outer wall of the discharge chute 38 may be adjusted by means of a threaded member 187, in threaded adjustment with the vertically disposed leg 188 of the angle 180, that in turn carries a threaded boss 190 that is adjustably disposed along the member 187, and which engages one end of a compression spring 191, the other end of which is in engagement against the member 177 as illustrated in FIG. 8, whereby a given spring force may be provided by means of the spring 191 normally urging the leftmost end of the frame 152 as it appears in FIG. 8, away from the wall 38 of the discharge chute, which compressive force must be overcome before the left-most end of the frame may be moved toward the discharge chute 38. It will apparent that adjustments of these features are provided, but that the present arrangement allows for pivotal movement of the frame 152 either for purposes of mounting adjustment, or for absorption of shocks and the like.

It will be apparent from the foregoing that the invention provided herein utilizes the normally undesirable reactive torque of the motor, by controlling the same, in order to automatically discontinue and continue the advancing drive, and consequently the advancing motion of the auger, depending upon the ability of the auger movement to move against the silage at any given time. The control function is therefore automatic.

It will be apparent that various modifications may be made in the details of construction, as well as in the use and operation of the system and components thereof, of the present invention, all within the spirit and scope of the appended claims.

What is claimed is:

1. In a drive system of the type in which a driven member has at least a pair of dissimilar drives, and wherein a first one of the drives is of the motor type for imparting a rotational drive component to the driven member, the improvement comprising movable mounting means for the motor type drive for movement of the motor from a normal operating position in response to resistance encountered by the driven member being driven by the motor type drive, and with means connecting the second of the drives to said motor for automatically de-activating the operation of said second of the drives in response to movement of the motor and automatically re-activating the operation of said second of the drives when said motor type drive returns to the normal operating position.

2. In a drive system of the type in which a driven member has at least a pair of dissimilar drives, and wherein a first one of the drives is of the electric motor type for imparting a rotational drive component to the driven member, the improvement comprising, movable mounting means for the electric motor type drive for movement of the motor from a normal operating position to a displaced position in response to resistance encountered by the driven member being driven by the electric motor type drive, and with means connecting the second of the drives to said motor for automatically de-activating the operation of said second of the drives in response to movement of the motor, and automatically re-activating the operation of said second of the drives when the motor returns to its normal operating position, and wherein the motor mounting means comprises means mounting the motor for pivotal movement in reactive response to motor torque developed in driving the driven member against resistance encountered thereby.

3. The system of claim 2, wherein said means connecting the second of the drives includes valve means mounted for actuation by said pivotal movement of the motor, said valve means having means operationally connecting it for temporarily de-actuating said second drive when said resistance means reaches a first predetermined level while allowing the first drive to remain operating, until the resistance drops to a second predetermined level, at which point the second drive is automatically re-actuated.

4. The system of claim 3, wherein a second drive is of the hydraulic operative fixed stroke cylinder type, and wherein said valve means is connected for automatically opening a hydraulic line of said second drive to discontinue the provision of hydraulic drive fluid to said cylinder when said valve means is opened and automatically closing the hydraulic line when said valve means is closed.

5. In a silo unloader system of the bottom unloader type in which a radially disposed auger is mounted at the bottom of a silo for a combined auger movement comprising a radial sweeping movement of the auger across the floor caused by a sweep drive means and rotation of the auger about its own axis caused by rotational drive means, for engaging silage contained within the silo by advancing the auger into the silage and moving the silage toward a generally central silo discharge location by auger rotation, wherein said sweep drive means and said rotational drive means are dissimilar, the improvement comprising said auger drive means being mounted for pivotal movement between a normal operating position and a displaced position in reactive response to torque developed therein in rotating the auger against silage, and with means connecting said rotational drive means and said sweep drive means for automatically controlling the advance of the auger into the silage by automatically controlling the sweep drive means in response to pivotal movement of the rotational drive means.

6. The system of claim 5, wherein said rotational drive means comprises an electric motor, and wherein valve means is provided for automatic actuation upon the pivotal movement of the rotational drive means reaching a predetermined value, said valve means comprising part of said connecting means.

7. The system of claim 6, wherein said sweep drive means comprises an hydraulic cylinder drive mechanism, and with said valve means comprising a valve, provided for discontinuing the provision of hydraulic fluid to said hydraulic drive mechanism, said valve being operationally connected to automatically open and close to control the sweep or advance of said auger in response to the resistance in rotating the auger against the silage, about its own axis.

8. In a silo unloader system of the bottom unloader type in which a radially disposed auger is mounted at the bottom of a silo for a combined auger movement comprising a radial sweeping movement of the auger across the floor caused by a sweep drive means and rotation of the auger about its own axis caused by rotational drive means, for engaging silage contained within the silo by advancing the auger into the silage and moving the silage toward a generally central silo discharge location by auger sweep rotation, the improvement comprising, said auger rotational drive means being mounted for pivotal movement between a normal operating position and a displaced position in reactive response to torque developed therein in rotating the auger against silage, and with means connecting said rotational drive means and said sweep drive means for automatically controlling the advance of the auger into the silage by automatically controlling the sweep drive means in response to pivotal movement of the rotational drive means, said rotational drive means comprises an electric motor, and wherein valve means is provided for automatic actuation upon the pivotal movement of the rotational drive means reaching a predetermined value, said valve means comprising part of said connecting means, said sweep drive means comprises a hydraulic cylinder drive mechanism, and with said valve means comprising a valve, provided for discontinuing the provision of hydraulic fluid to said hydraulic drive mechanism, said valve being operationally connected to automatically open and close to control the sweep or advance of said auger in response to the resistance in rotating the auger against the silage, about its own axis, and wherein said motor is mounted in an outer frame, said valve means being carried by said outer frame, and with a valve actuating linkage being carried for pivotal movement with said motor.

9. The system of claim 8, wherein anti-friction mounting means are provided for mounting said motor relative to said outer frame, for ease of pivoting relative thereto.

10. The system of claim 8, including stop means carried for pivotal movement with said motor for limiting the pivotal movement of the motor to a predetermined arc.

11. The system of claim 8, including spring means for opposing pivotal movement of the motor in a valve opening direction.

12. The system of claim 8, wherein anti-friction mounting means are provided for mounting said motor relative to said outer frame, for ease of pivoting relative thereto, including stop means carried for movement with said motor for limiting the pivotal movement of the motor to a predetermined arc, including spring means for opposing pivotal movement of the motor in a valve opening direction.

13. In a silo unloader system of the bottom unloader type in which a radially disposed auger is mounted at the bottom of a silo for a combined auger movement comprising a radial sweeping movement of the auger across the floor caused by a sweep drive means and rotation of the auger about its own axis caused by rotational drive means, for engaging silage contained within the silo by advancing the auger into the silage and moving the silage toward a generally central silo discharge location by auger rotation, the improvement comprising, said auger rotational drive means being mounted for pivotal movement in reactive response to torque developed therein in rotating the auger against silage, and with means connecting said rotational drive means and said sweep drive means for automatically controlling the advance of the auger into the silage by automatically controlling the sweep drive means in response to pivotal movement of the rotational drive means, said rotational drive means comprising an electric motor, and wherein valve means is provided for automatic actuation upon the pivotal movement of the rotational drive means reaching a predetermined value, said valve means comprising part of said connecting means, said sweep drive means comprises a hydraulic cylinder drive mechanism, and with said valve means comprising a valve, provided for discontinuing the provision of hydraulic fluid to said hydraulic drive mechanism, said valve being operationally connected to automatically open and close to control the sweep or advance of said auger in response to the resistance in rotating the auger against the silage, about its own axis, and wherein said motor is mounted in an outer frame, said valve means being carried by said outer frame, and with a valve actuating linkage being carried for pivotal movement with said motor, and wherein said outer frame is pivotally mounted at one end for pivotal movement of the frame and motor toward and away from the motor's connection with the auger.

14. The system of claim 13, wherein an opposite end of said outer frame to that end which is pivotally mounted is provided with adjustable vertical support means and with spring-urged adjustable means spacing said outer frame in a displacement direction toward and away from the motor's connection with the auger.

15. In a silo unloader system of the bottom unloader type in which a radially disposed auger is mounted at the bottom of a silo for a combined auger movement comprising a radial sweeping movement of the auger across the floor caused by a hydraulically operated sweep drive means and rotation of the auger about its own axis caused by an electrically operated rotational drive means, for engaging silage contained within the silo by advancing the auger into the silage and moving the silage toward a generally central silo discharge location by auger rotation wherein said rotational drive means comprises an electric motor, and including drive train means connecting said motor and said auger at a substantially radial inner portion of the auger at about the geometric center of the silo for rotationally driving the auger from its radial inner end, wherein said central silo discharge location comprises a substantially open dischargeway generally concentrically disposed at the center of the silo connecting the silo with a zone therebeneath, with a first portion of the drive train means being located in the dischargeway and spaced radially inwardly of portions of the open dischargeway leaving generally vertically directed silage discharge openings, wherein said motor is mounted at a location radially outside said dischargeway, and with a second portion of said drive train means traversing said discharge openings connecting said motor and said first portion of said drive train means, and said auger drive means being mounted for pivotal movement from a normal operating position to a displaced position in reactive response to torque developed therein in rotating the auger against silage, and with means connecting said rotational drive means and said sweep drive means for automatically controlling the sweep drive means in response to pivotal movement of the auger drive means.

16. The system of claim 15, wherein valve means is provided for automatic actuation upon the pivotal movement of the rotational drive means reaching a predetermined value, said valve means comprising part of said connecting means, wherein said sweep drive means comprises an hydraulic cylinder drive mechanism, and with said valve means comprising a valve provided for discontinuing the provision of hydraulic fluid to said hydraulic drive mechanism, said valve being operationally connected to automatically open and close to control the sweep or advance of said auger in response to the resistance in rotating the auger against the silage, about its own axis, wherein said second portion of said drive means is provided with a drive protector for protecting said second train portion from silage falling through said opening, wherein said protector includes at least one sloped upper surface having a slope sufficient to deflect vertically falling silage thereoff.

17. In a silo unloader system of the bottom unloader type in which a radially disposed auger is mounted at the bottom of a silo for a combined auger movement comprising a radial sweeping movement of the auger across the floor caused by a sweep drive means and rotation of the auger about its own axis caused by rotational drive means, for engaging silage contained within the silo by advancing the auger into the silage and moving the silage toward a generally central silo discharge location by auger rotation, the improvement comprising, said auger rotational drive means being mounted for pivotal movement from a normal operating position to a displaced position in reactive response to torque developed therein in rotating the auger against silage, and with means connecting said rotational drive means and said sweep drive means for automatically controlling the advance of the auger into the silage by automatically controlling the sweep drive means in response to pivotal movement of the rotational drive means, said rotational drive means comprising an electric motor, and said sweep drive means comprising a hydraulic cylinder drive mechanism wherein said connecting means comprising valve means provided for discontinuing the provision of hydraulic fluid to said hydraulic drive mechanism, said valve means being operationally interconnected to both said electrical motor and said hydraulic drive mechanism by means of a valve actuating linkage adapted to automatically open and close said valve means to control the sweep or advance of said auger in response to the resistance in rotating the auger against the silage, about its own axis.

* * * * *

UNITED STATES PATENT OFFICE
CERTIFICATE OF CORRECTION

Patent No. 4,095,703      Dated June 20, 1978

Inventor(s) Richard L. Weaver

It is certified that error appears in the above-identified patent and that said Letters Patent are hereby corrected as shown below:

In the Abstract, Line 6, "mmotor" should be --motor--.

In the Abstract, Line 17, after the first occurance of "the" insert --motor torque developed in--.

Column 2, Line 32, "tranverse" should be --transverse--.

Column 4, Line 12, after the second occurrance of "back" insert --65--.

Column 4, Line 46, after "82" insert --(--.

Column 11, Line 16 after the second occurrance of "drive" insert --train--.

Signed and Sealed this

Sixteenth Day of January 1979

[SEAL]

Attest:

RUTH C. MASON
Attesting Officer

DONALD W. BANNER
Commissioner of Patents and Trademarks